United States Patent [19]
Sanghera et al.

[11] Patent Number: 5,735,927
[45] Date of Patent: Apr. 7, 1998

[54] METHOD FOR PRODUCING CORE/CLAD GLASS OPTICAL FIBER PREFORMS USING HOT ISOSTATIC PRESSING

[75] Inventors: Jasbinder Sanghera, Greenbelt, Md.; Pablo Pureza, Burke; Ishwar Aggarwal, Fairfax, both of Va.; Robert Miklos, LaPlata, Md.

[73] Assignee: The United States of America as represented by the Secretary of the Navy, Washington, D.C.

[21] Appl. No.: 672,771

[22] Filed: Jun. 28, 1996

[51] Int. Cl.$^6$ ............................................. C03B 37/012
[52] U.S. Cl. ........................ 65/389; 65/412; 65/36
[58] Field of Search .................... 65/428, 429, 412, 65/389, 36

[56] References Cited

U.S. PATENT DOCUMENTS

| | | | |
|---|---|---|---|
| 4,908,053 | 3/1990 | Nishii | 65/389 |
| 5,078,768 | 1/1992 | Aggarwal | 65/388 |
| 5,352,259 | 10/1994 | Oku | 65/412 |

FOREIGN PATENT DOCUMENTS

| | | | |
|---|---|---|---|
| 2426590 | 12/1975 | Germany | 65/412 |
| 2037273 | 7/1980 | United Kingdom | 65/412 |

*Primary Examiner*—John Hoffmann
*Attorney, Agent, or Firm*—Thomas E. McDonnell; Barry A. Edelberg

[57] ABSTRACT

Core/clad glass optical fiber preforms free of bubbles and soot at the core/clad interface are fabricated by inserting a glass core rod into a cladding glass tube sized so that space remains between them, sealing the top and bottom of the tube onto the core rod to form a sealed space between them which is relatively soot free and under a vacuum and then hot isostatically pressing the sealed composite to collapse the tube onto the rod and also collapse bubbles in the glass. Soot formation is avoided or minimized by purging the space with inert gas while the bottom of the tube is collapsed onto the rod and by sealing the top under a dynamic vacuum and at the lowest possible temperature to avoid soot formation without cracking the glass. The space is vacuum outgassed before the second seal is made. Chalcogenide fiber drawn from a preform made in this fashion exhibits very low transmission losses.

16 Claims, 4 Drawing Sheets

METHOD FOR PRODUCING CORE/CLAD GLASS OPTICAL FIBER PREFORMS USING HOT ISOSTATIC PRESSING

BACKGROUND OF THE INVENTION

1. Field of the Invention

The invention relates to a method for forming core/clad glass preforms for optical fibers using hot isostatic pressing and to the preforms produced by the method. More particularly, the invention relates to producing preforms for optical fibers which are free of gas bubbles and relatively free of interfacial soot by forming a preform composite of a glass cladding tube hermetically sealed at both ends to a glass core rod within, in which the core/cladding interfacial area is under vacuum and has been outgassed at a temperature low enough to prevent or minimize interfacial soot formation, and hot isostatic pressing the composite to collapse the tube onto the rod and eliminate gas bubbles in the glass.

2. Background of the Invention

Optical fibers, windows and filters find increasing use for many applications, particularly in data transmission. For example, silica based optical fibers are widely used in the telecommunications industry. However, silica fibers transmit only up to about 2 mm and there are many applications in which the wavelengths are longer than 2 mm, such as infrared imaging, detection and analysis of high temperatures and high temperature effects, power delivery from CO and $CO_2$ lasers, remote fiber optic chemical sensing systems for the clean up of Department of Defense and Department of Energy facilities and other industrial applications. This is because practically all molecular species possess characteristic vibrational bands in the infrared region between 3–11 mm. Zirconium fluoride based fibers transmit to about 3.5 mm, but this still isn't sufficient for most infrared systems. Chalcogenide glass transmits to beyond 10 mm and is therefore used for optical fibers, windows and filters in fiber optic based sensor systems using evanescent, absorption and diffuse reflectance spectroscopies, which require long wavelength infrared transmission capability. Since the efficiency and capability of such systems depends in large measure on the attenuation of the infrared signal by the glass, it is important that the glass have low transmission losses. Therefore, there is a need to fabricate low loss chalcogenide glass fibers, windows and filters, and especially in long lengths, to enhance the capabilities of many systems. For practical applications the chalcogenide glass fibers need to be glass clad to eliminate evanescent absorption and bending losses. Core and cladding glass compositions are selected so that the core refractive index is higher than that of the cladding while maintaining similarity in thermal properties. However, significant transmission losses can and do occur with the use of glass clad chalcogenide fibers due to bubbles in both the core and cladding glass and at the core/cladding glass interface, and also due to soot particles at the core/cladding glass interface caused by fabrication of the fiber optic preforms and drawing of the clad fibers. These bubbles and soot particles act to scatter the infrared signals being transmitted which results in significant transmission losses.

Methods for fabricating core/clad glass preforms include using heat to collapse a cladding glass tube onto a core glass rod as disclosed, for example, in U.S. Pat. No. 4,820,322. This method does not remove gas bubbles present in either the core or cladding glass and it also produces soot in the interfacial space between the core and cladding glasses. These defects remain in the preform and in fibers produced from the preform, which results in significant attenuation and concomitant transmission losses. Other methods for fabricating core/clad optical fiber preforms and optical fibers have included double crucible processes as disclosed in U.S. Pat. Nos. 4,925,475 and 4,729,777 in which core and cladding glass chunks are melted in separate, but concentric crucibles and melted at elevated temperatures for long periods of time for homogeneity. The melts are simultaneously withdrawn from the crucible bottoms so that the cladding glass flows around the core glass. This process is difficult to control, uniform concentricity of the core and cladding glasses is extremely difficult to achieve, and it does not eliminate bubbles. Further, it is not suitable for use with the relatively volatile and unstable chalcogenide glass compositions as volatilization losses lead to compositional variations in the core and cladding glasses which itself leads to increased optical losses. Another method includes melting or casting a core glass inside a cladding glass cylinder as disclosed in U.S. Pat. No. 5,160,521, in which method the core glass melt will volatilize and form soot at the core/cladding interface. U.S. Pat. No. 5,106,400 discloses a method of filling up the bore of a cladding glass cylinder with a core glass melt while both glasses are above the liquidus temperature. This method is applicable only to glass compositions which have low liquidus viscosities and a narrow range of working temperatures. While perhaps reducing soot formation, this method does not completely eliminate it and cannot avoid at least some mixing or diffusion of the two glasses at their common interface. The most commonly used method for producing optical fibers from a core/clad preform, particularly with chalcogenide glass, uses a preform composite which consists of a core rod inside a cladding glass tube, with the composite slowly lowered into the heating zone in a fiber drawing furnace in which the glasses melt, flow down and are drawn into a fiber. U.S. Pat. No. 4,908,053 discloses one variation of this method in which the heating zone is at the bottom of the furnace and a vacuum is applied to the space between the glass core rod and cladding tube to collapse the tube onto the rod at a temperature lower than the fiber drawing temperature. In this method the cladding glass collapses onto the rod only at the bottom which is at the drawing temperature, as the rod-in-glass structure is slowly lowered into the furnace. While this method minimizes gas bubble formation at the core/clad interface and also reduces soot, it does not eliminates the soot formation in the interfacial space between the core rod and cladding glass tube nor does it reduce or eliminate bubbles in the glass. Bubbles in the glass and soot formation in the interfacial space between the core rod and cladding glass tube continue to be a problem with all core/clad glass preforms and particularly with the lower softening temperature chalcogenide glasses. One attempt to eliminate bubbles is disclosed in U.S. Pat. No. 5,078,768 which uses hot isostatic pressing (HIPping) of an unclad fluoride glass preform rod. In this method, the fluoride glass body or preform is heated in an argon atmosphere to a temperature just above its softening point and the pressure on the glass increased to 10 ksi to collapse the bubbles in the glass, after which the temperature and pressure are reduced. However, the method in this patent is directed to a single glass body and not a core/-clad composite. Therefore, there is still a need for a method of producing core/clad glass optical fiber preforms and optical fiber with little or no soot formation at the interface between the glasses, and which will also eliminate bubbles or at least minimize the size and frequency of bubbles present in the glasses.

SUMMARY OF THE INVENTION

Accordingly, it is an object of this invention to reduce soot formation at the interface between a core and cladding glass in a glass fiber.

It is another object of the present invention to minimize the presence of bubbles in a glass fiber.

It is a further object of an embodiment of the present invention to produce low-loss chalcogenide glass fibers having a core and a cladding.

These and additional objects of the invention are accomplished by forming a core/cladding glass composite in which the cladding tube is hermetically sealed to the core rod within having a gap or space between the outer surface of the rod and inner surface of the tube which has been vacuum outgassed, is relatively free of soot and under a vacuum, and then hot isostatically pressing (HIPping) the composite at the glass softening temperature, which is a temperature above the glass transition temperature, to collapse the tube onto the rod and collapse bubbles in the glass. The invention also relates to the preform produced by the method and to optical fiber drawn from the preform. In a broader sense, the method of the invention is not limited to optical fiber preforms, but is also useful with other glass bodies such as lenses, windows, and planar wave guides which are a composite of two glass bodies having a common interface. Thus, in a broader sense the invention relates to a method for forming a compound glass body from two glass bodies having a common interface in which the two glasses are in intimate contact with each other and to the compound glass body formed by the method, wherein the method comprises hot isostatic pressing, at a temperature above the glass transition temperature, a composite of two glass bodies having a hermetically sealed space between them which is under a vacuum, to collapse the two bodies against each other to eliminate the space between them and to eliminate bubbles in the bodies, reducing the temperature to below the transition temperature and then reducing the pressure. It is preferred that the sealed space has been vacuum outgassed and is relatively free of soot. More particularly the method of the invention comprises (i) placing two glass bodies adjacent each other to form an interfacial space between them, (ii) outgassing the interfacial space below the soot formation temperature, (iii) forming a hermetic seal around the periphery of the interfacial space under a vacuum so that the sealed space remains under vacuum after sealing, (iv) hot isostatically pressing the sealed bodies above the glass softening temperature to eliminate the space and collapse bubbles in the glass, (v) reducing the temperature below the glass softening temperature and (vi) reducing the pressure, wherein the outgassing and sealing do not produce soot in the interfacial area. The outgassing is preferably accomplished under a vacuum and most preferably under a dynamic vacuum to remove volatiles and thereby minimize soot formation. In one sense therefore, the invention relates to producing a glass laminate and to the laminate itself. Relatively free of soot is a term of art which is difficult to quantify and in the context of the invention means less soot is present than would be formed if the glass was heated to a temperature and under conditions which are known to form soot, as is explained in greater detail below. In any event, the method of the invention results in less soot formation than known prior art processes.

While this method is useful with all glass compositions, it has been found to be particularly useful in making core/clad glass optical fiber preforms from chalcogenide glasses which are prone to soot formation. In the embodiment in which the method of the invention is used to form a core/clad glass preform for producing optical fiber, the method comprises the steps of (i) inserting a glass core rod into a cladding glass tube sized so that a space remains between the rod and tube, (ii) softening one end of the tube to collapse it onto the core rod and form a hermetic seal, (iii) vacuum outgassing the space between the rod and tube, (iv) softening the other end of the tube to the core rod while maintaining the vacuum in the space between the rod and tube, to form a sealed composite having a vacuum in the space between the rod and tube, (v) hot isostatic pressing the sealed composite above the glass softening temperature to eliminate the space and bubbles in the glass, (vi) reducing the temperature below the glass softening temperature, and (vii) reducing the pressure. The vacuum outgassing is done at a temperature low enough to minimize soot formation and below the fiber draw temperature. Chalcogenide clad glass optical fiber produced by the method of the invention have exhibited extremely low transmission losses. As those skilled in the art know, chalcogenide glasses comprise at least one of the chalcogenide elements S, Se and Te and typically further include at least one of Ge, As, Sb, Tl, Pb, Si, P, Ga, In Cl, Br and I. Such glasses can also contain one or more rare earth elements. Chalcogenide glass typically contains at least about 25 mole % and more generally at least 50 mole % of one or more of the three chalcogenide elements. The presence of tellurium in the glass composition has been found to increase the transmission in the infrared region. Thus, while sulphide fibers such as $As_2S_3$ transmit from about 1–6 mm, the transmission window is increased to beyond 10 mm by including the heavier chalcogenide element tellurium. Glasses containing high levels of tellurium typically transmit in the 3–12 mm region.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein.

DESCRIPTION OF THE PREFERRED EMBODIMENTS

Figure 1:
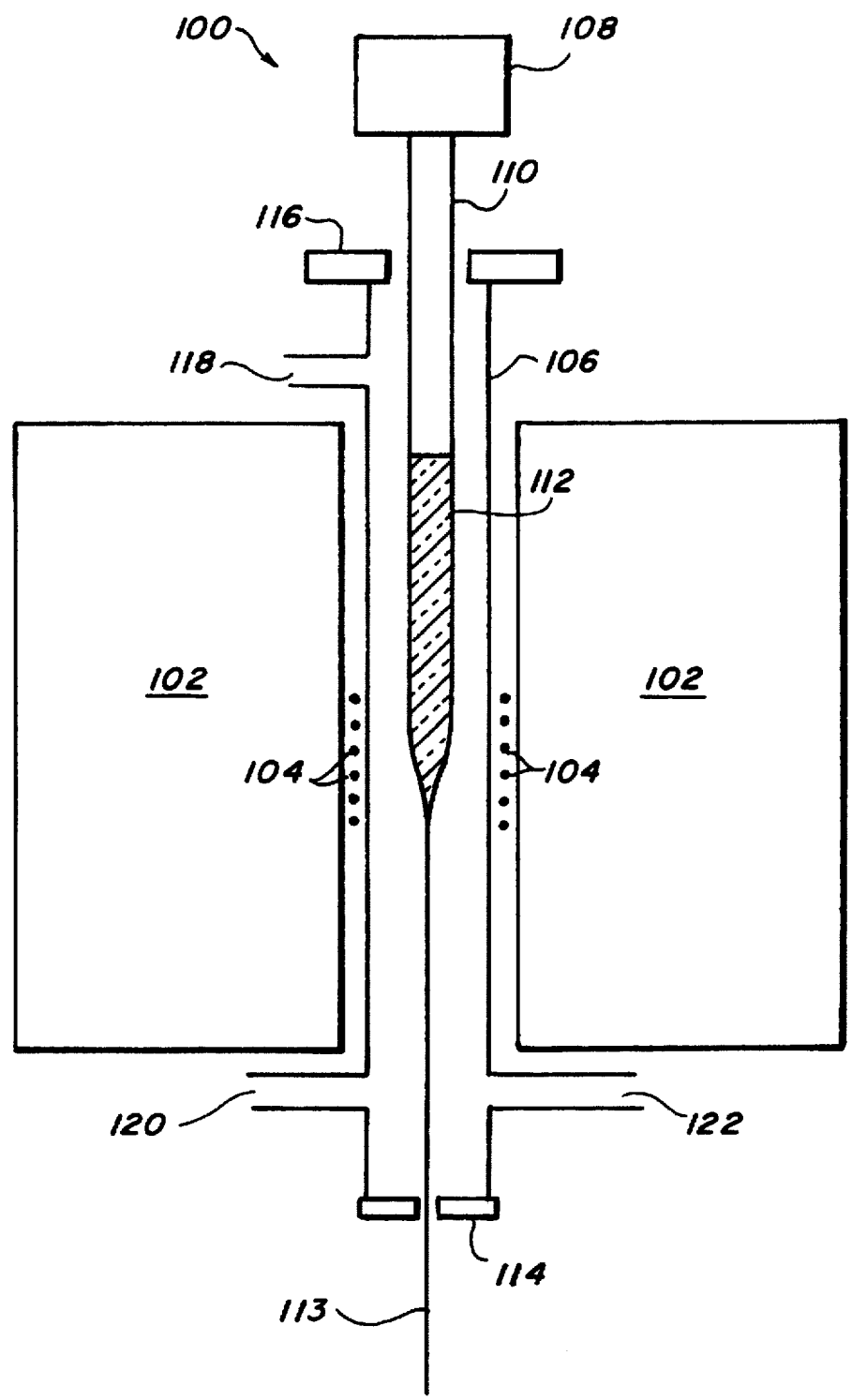
FIG. 1 schematically illustrates a typical furnace arrangement for drawing optical fibers from core/clad glass preforms.

FIG. 1 schematically illustrates a typical furnace arrangement 100 for drawing optical fibers from core/clad glass preforms which comprises insulation 102 surrounding electrical heating elements 104 within for heating quartz glass furnace 106. Feed means 108 is attached by glass rod 110 to core/clad glass preform 112 and slowly lowers the vertically oriented preform into the furnace 106 so that the bottom of the preform is maintained proximate heating elements 104 as optical fiber 112 is drawn from the bottom of the furnace through iris 114. Seal 116 maintains temperature stability inside the furnace 100 by preventing heat loss due to convection. A dry nitrogen purge is fed into gas inlets 118 and 120 as the inert atmosphere, exiting through gas outlet 122. This furnace arrangement differs from that shown in the Nishi, et al U.S. Pat. No. 4,908,053 in that the heating elements in the Nishi, et al patent are located at the bottom of the furnace instead of at about the middle as illustrated in FIG. 1.

Figure 2B:
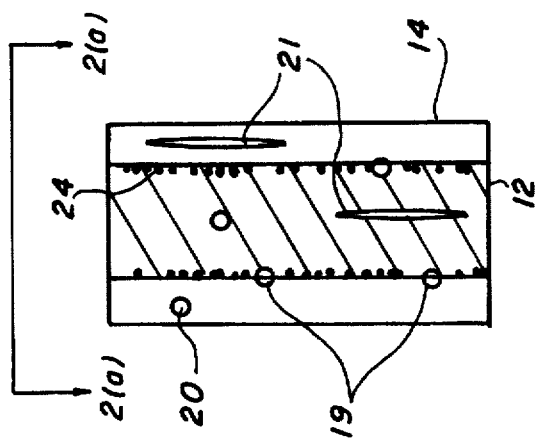
FIGS. 2(a) and 2(b) schematically illustrate, in partial cross-section, soot formation and bubble entrainment which occurs using a typical prior art rod-in-tube optical fiber drawing process.
Figure 2A:
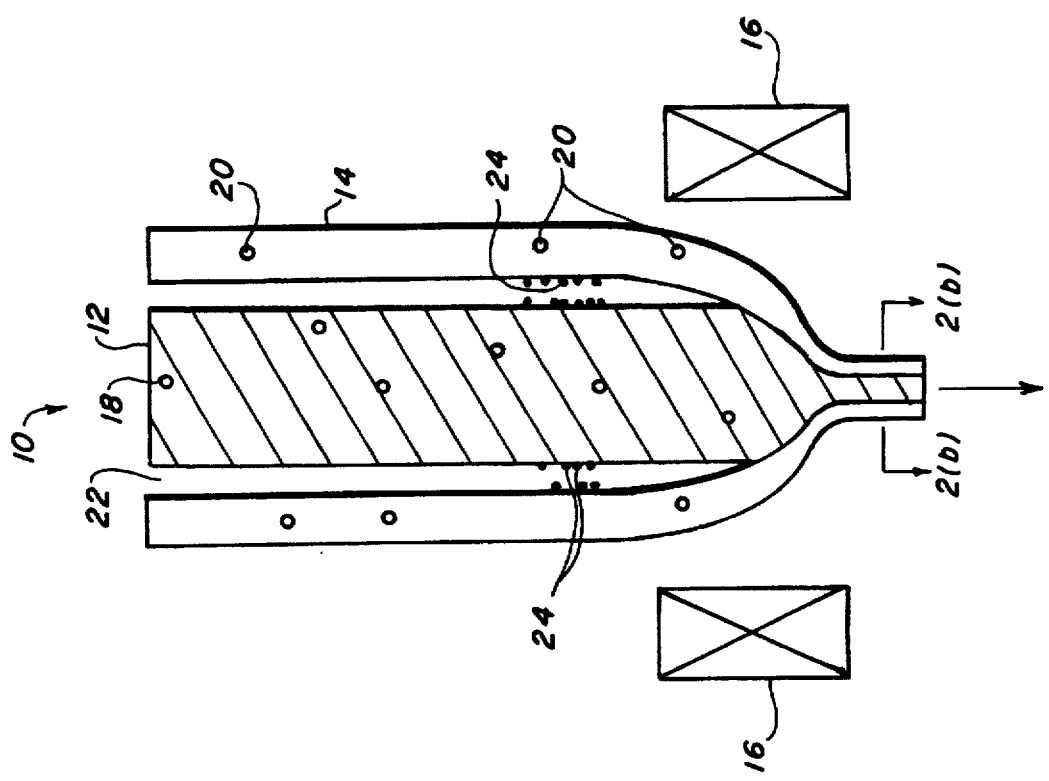

FIGS. 2a and 2b schematically illustrate, in partial cross-section, soot formation and bubble entrainment which occurs using a typical prior art process for drawing optical fiber from a rod-in-tube chalcogenide or other glass preform. Thus, referring to FIG. 2(a), a preform 10 comprising a core rod 12 inside a cladding glass tube 14 is shown with its bottom end surrounded by heating elements 16 of a drawing furnace (not shown) of the type disclosed in FIG. 1. Gas bubbles 18 and 20 are shown trapped in their respective core and cladding glasses. Those skilled in the art know that all glass contains gas bubbles as a normal consequence of the glass manufacturing processes in which some of the water and gasses adsorbed on the surface of the ingredients or chemicals in the batch melted to form the glass become trapped in the melt. Another source of bubbles arises from volatilization of some of the constituents in the glass itself which do not redissolve in the melt during the glass making process. Yet another source of bubbles is the gas present in the small voids present in the particulate materials which form the batch to be melted. Referring again to FIGS. 2a and 2b, the bottom of the preform is reduced by a drawing die (not shown) from which the optical fiber (not shown) is drawn. As the optical fiber is drawn from the preform, the preform 10 is slowly lowered into the die and furnace to insure an adequate supply of core/clad glass melt in the hot zone. The temperature of the glass being melted so as to flow into the die and be drawn as optical fiber is hot enough to vaporize some of the constituents of the glass composition in the core/cladding tube interfacial area 22 which condenses as fine particles known as soot represented by solid dots 24 on the cooler interfacial surfaces higher up in the furnace and further away from the heat source. In this prior art process the interfacial soot deposits and entrained gas bubbles remain in the glass and consequently become part of the drawn fiber. FIG. 2(b) schematically illustrates in greater detail the fiber being drawn through the furnace taken at section A—A of FIG. 2(a). The gas bubbles remain entrained in the core and cladding glasses. Additional bubbles 19 are produced by the collapse of the tube around the rod during the necking down and drawing of the fiber. Some of the bubbles that were present in the core and cladding glass deform during the drawing process to form elongated bubbles which are microcapillaries. The soot particles and bubbles result in attenuation of signals transmitted over the optical fiber which exhibits itself as transmission losses. The Nishi, et al process referred to above is an attempt to reduce the interfacial soot and bubble formation by collapsing the tube around the rod at a lower drawing temperature. This is done by maintaining a vacuum in the space between the rod and tube, while increasing the pressure on the outside of the tube to several atmospheres. However, while minimizing interfacial bubble formation, there is still sufficient glass volatilization and concomitant soot formation to result in transmission loss. Further, this prior art process does not eliminate the bubbles present in the core rod and cladding tube. Unlike the Nishi, et al prior art process which collapses the cladding glass tube over the glass core rod in a gradual, almost incremental fashion as the fiber is drawn from the rod-in-tube assembly, the method of the invention collapses the cladding glass tube onto the glass core rod all at once in a single step by the HIPping. However, if desired for some reason, the method of the invention can also be used to collapse the tube over the rod in a gradual, incremental manner.

Figure 3:
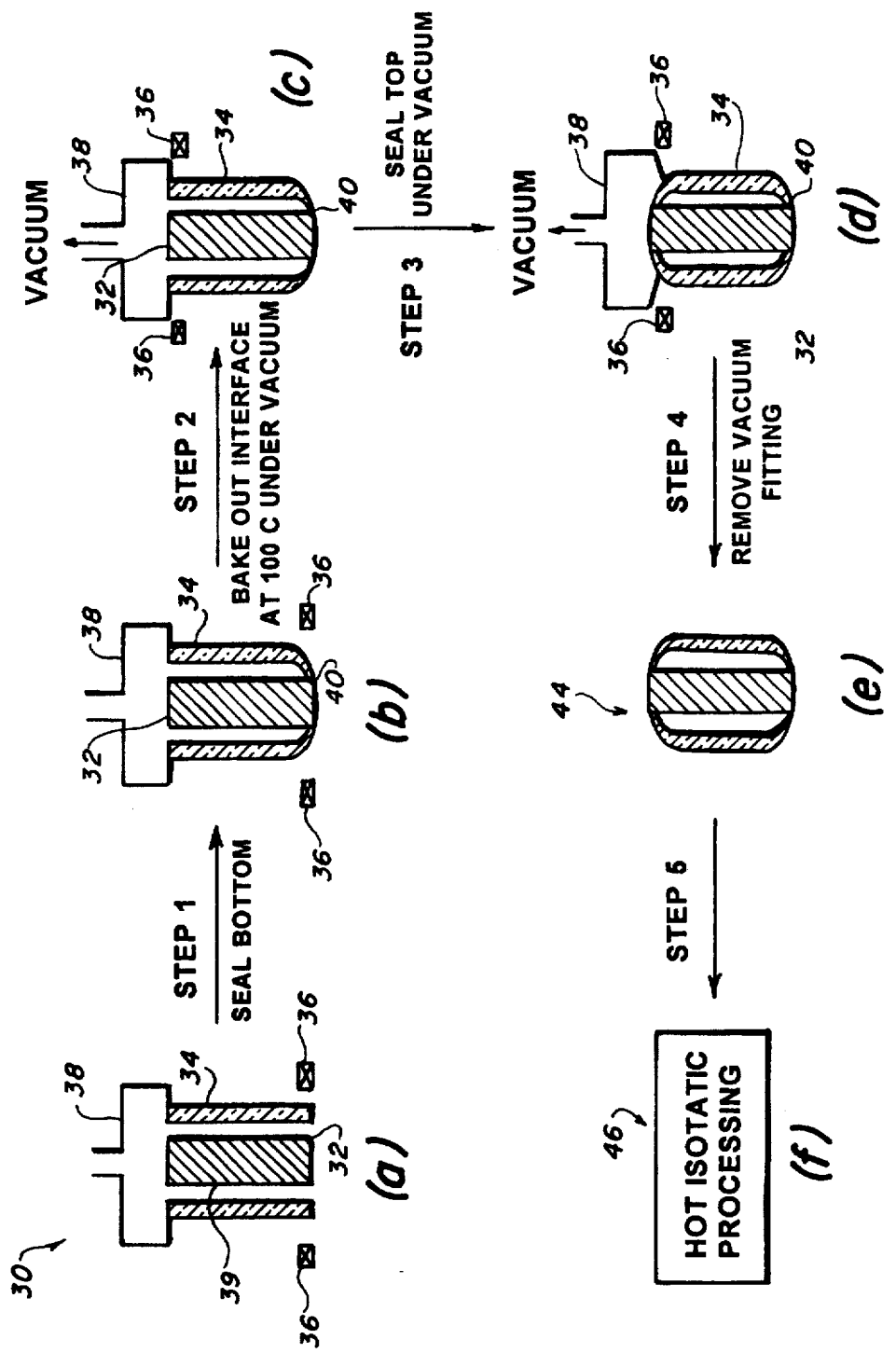
FIG. 3 is a partial cross-section schematic of the various process steps used in the method of the invention.

FIG. 3 illustrates the various steps in fabricating a core/clad glass optical fiber preform according to the method of the invention. In this illustration, for the sake of convenience the temperatures are taken from Example 2 below in which a preform of the invention is fabricated from chalcogenide glass. However, as those skilled in the art will appreciate, the invention is not intended to be limited to use with chalcogenide glass compositions, nor is it intended to be limited to fabricating only core/clad optical fiber preforms as set forth above under the SUMMARY. Turning to FIG. 3(a) an optical fiber preform 30 consisting of a glass core rod 32 inserted into a glass cladding tube 34 is schematically illustrated as being vertically held at the top of an optical fiber drawing furnace (not shown) of the type illustrated in FIG. 1 so that the heating coils, briefly illustrated by boxes 36 for the sake of convenience, are proximate the bottom of the preform. The glass core rod is 10 mm long and 6 mm in diameter. The cladding glass tube is 10 mm long with an inner diameter of 6.2 mm to provide a 0.1 mm space between the tube and rod within. While the method of the invention has been used to fabricate core/clad glass preforms from a core-in-tube assembly in which the gap between the core rod and cladding tube was as large as 500 mm (0.500 mm) to demonstrate the versatility of the method, the gap is typically less than 0.1 mm. In one case the gap was as low as 0.03 mm. Those skilled in the art will appreciate that the rod can be longer than the cladding tube if desired and the unclad length of the so-formed preform removed from the pertinent end prior to fiber drawing. The gap size will vary with the size of the core rod and tube as is known and appreciated by those skilled in the art and the maximum workable gap increases with increasing diameter of the glass core rod. Thus, if core rods having a diameter greater than 6 mm are used, the maximum workable gap will be greater than 0.5 mm. Those skilled in the art will appreciate that the rod can be longer than the cladding tube if desired. The essential feature is that the space between the two seals be outgassed and relatively free of soot. Inert gas (e.g., nitrogen) flows down through the gap or interfacial area between the core rod and cladding tube while the heating coils soften the bottom of the glass tube at a temperature low enough to minimize soot formation, yet sufficient to soften the glass and collapse it onto the bottom of the core rod to form a hermetic seal 40 as shown in 3(b). The soot formation temperature varies from glass to glass and is determined empirically. During this operation, even if some of the glass volatilizes, soot formation is avoided by the presence of the downwardly flowing inert gas which sweeps the volatile material down and out of the interfacial space, thereby preventing it from rising up into the interfacial space and condensing on the cooler part of the rod or tube to form soot. If the gas flowed in the opposite direction it would sweep any volatiles from the hotter seal area into the cooler portion of the space and thereby exacerbate soot formation instead of minimizing it. In a broader sense therefore, the inert gas flows through and out of the interfacial space in a manner such that it flows from the from the cooler portion out through the hot seal area until the seal is formed. A vacuum connection 38 is made to the top of the preform for applying a vacuum to the interfacial space 40 between the core rod and cladding tube. Next, the bottom sealed assembly formed in 3(b) is heated to a temperature of 100° C. while under a vacuum to outgas the evacuated interfacial space between the rod and tube as shown in 3(c). A temperature of 100° C. has been found sufficient to remove adsorbed water and other surface adsorbed gasses from the glass surfaces within the space. While maintaining the vacuum in the interfacial space, the top of the cladding tube is heated to collapse it onto the core rod and form a hermetic seal 42 at the top of the assembly at the lowest possible temperature to minimize or avoid soot formation. The vacuum is preferably a dynamic vacuum continuously applied to the interfacial area during the sealing to remove as much as possible in the way of any volatiles that may be produced by the glass during the heating and sealing, to avoid condensation and concomitant soot formation in the interfacial space. This thereby forms a core/clad preform in which the top and bottom of the glass cladding tube are hermetically sealed to the respective top and bottom of the glass core rod, with the interfacial space between them having been outgassed under vacuum at a temperature too low to produce soot, thereby keeping the interfacial space 39 free of soot and adsorbed water and gasses. This is illustrated in 3(d). Completing the hermetic sealing of the preform as shown in FIGS. 3(c) and 3(d) keeps the interspacial area and surfaces under the vacuum and free of the possibility of further contamination during handling and further processing. The vacuum fitting is removed and the final preform 44 in FIG. 3(e) is ready for the next step in the method of the invention which is the hot isostatic pressing schematically illustrated by box 46 in FIG. 3(f). It will be appreciated by those skilled in the art that while it is convenient to seal the cladding glass tube onto the core rod at the top and bottom of the tube, there may be some cases where it is more convenient not to make the seals at the top and/or bottom. For example, the seals could be made partway down and up from the respective top and bottom of the tube and the rod may also extend beyond one or both seals. Thus, in such embodiments the tube is sealed to the rod at two longitudinally spaced apart locations on the tube. That is, the seals are spaced apart from each other along the longitudinal axis of the tube. Still further, more than one sealed space may be made using the process of the invention as will be appreciated by those skilled in the art to which the invention pertains.

Figure 4:
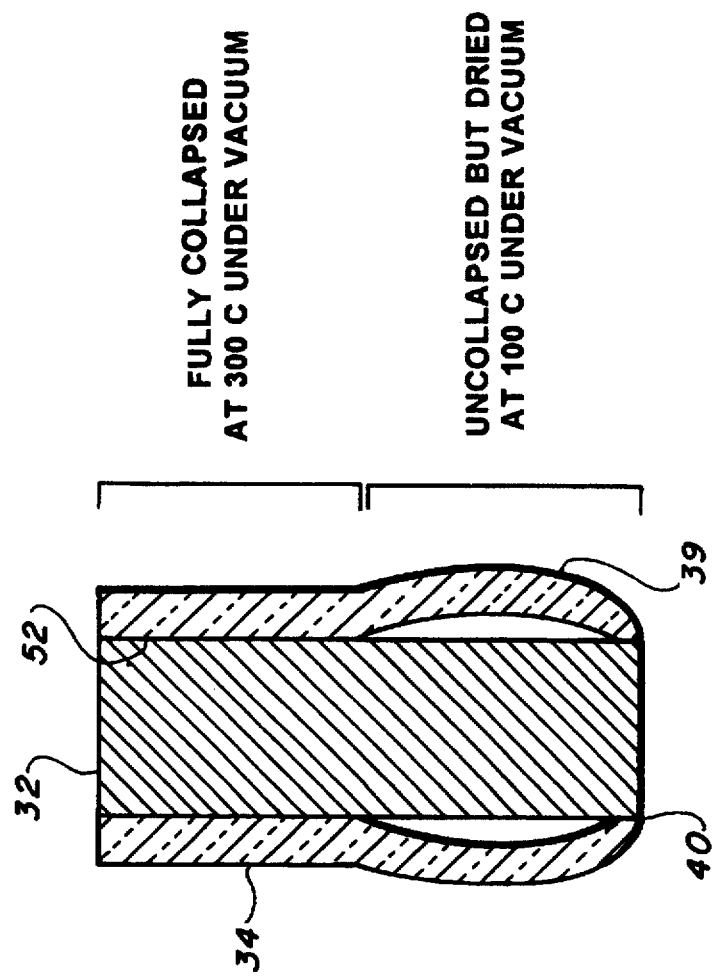
FIG. 4 is a cross-sectional schematic illustration of a single core/clad glass optical fiber preform, only half of which is made according to the method of the invention.

FIG. 4 is a simple schematic of a preform 50 of which only the bottom half has been processed according to the method of the invention and the top half according to the prior art. Fabrication of a chalcogenide glass core/clad preform as illustrated in FIG. 4 has been achieved to compare the prior art process with the method of the invention under conditions in which the glass compositions and dimensions are otherwise identical. The actual experiment is set forth in Example 3 and Comparative Example A below. While the core rod 32, the cladding glass tube 34, the bottom seal 40 and the outgassed and evacuated interfacial space 39 are the same as in FIG. 3, the cladding glass has been collapsed over the top half of the preform at a temperature high enough to result in soot formation (not shown) in the interfacial area as with the prior art preform of FIGS. 2a and 2b and without having been outgassed. Optical fiber drawn from the bottom half of this preform which was precessed according to the method of the invention had extremely low transmission losses, while optical fiber drawn from the top half had transmission losses almost twice that of the fiber from the bottom half.

While the illustrations above and the examples below are specifically directed to making core/clad glass preforms for producing optical fiber from a cylindrical glass core rod and a cylindrical glass cladding tube, the method of the invention is not limited to this particular embodiment. Thus, the rod and/or tube can be elliptical or of some other suitable shape and need not be a rod or tube as set forth under the SUMMARY. Still further, while above illustrations have been directed to multimode optical fiber production, the method of the invention is also useful for producing preforms for the production of single mode optical fibers. For single mode chalcogenide fiber fabrication, the core and cladding glass diameters can be, for example, approximately 15 and 125 mm, respectively. Therefore the core to cladding diameter ratio in the fiber and subsequently the preform needs to be approximately 1:8. For a 6 mm diameter core rod, the cladding tube outer diameter would have to be 48 mm. This is not practical since tubes of this outer diameter and only about a 6 mm inner diameter cannot be fabricated easily. Alternatively, for a 10 mm outer diameter cladding tube, the core would have to be 1.25 mm and the inner diameter of the tube would have to be close to this value. Making core rods and cladding ID's of this small size with precision is extremely difficult to do.

The conventional way to make a single mode fiber (such as with fluoride fibers) is to take a core/clad preform and stretch it at above the softening temperature. This is then inserted into a cladding tube of the same size as the original tube which is then collapsed onto the first preform either before or during fiber drawing. However, the method of the invention is useful for fabricating the initial core/clad preform as well as collapsing the extra cladding tube onto the initial preform. This process can be repeated as many times as is necessary for subsequent outer cladding tube attachments to build up the cladding to core ratio to single mode proportions.

Having described the invention, the following examples are given to illustrate specific applications of the invention including the best mode now known to perform the invention. These specific examples are not intended to limit the scope of the invention described in this application.

EXAMPLES

Example 1

Chalcogenide core glass rods having a composition $As_{40}S_{55}Se_5$ (atomic %) were fabricated from elemental starting materials of reagent grade purity which had been further purified. For each rod, the arsenic, sulfur and selenium were weighed out, dry mixed and placed in a quartz glass ampoule made from fused silica in a dry box, with the ampoules then evacuated and sealed with an oxygen-methane torch. Melting of the glass batches was done at 850° C. for 8 hours in a rocking furnace to facilitate mixing. The melts were then quenched with the ampoules in a vertical position and annealed from about the glass transition temperature (200° C.) to produce rods approximately 8 cm in length and 6 mm in diameter. The difference in thermal expansion and contraction between the chalcogenide glass and the quartz glass results in the diameter of the chalcogenide glass rods being slightly less than that of the quartz, so that the rods are merely removed from the ampoules after the top has been broken off. The core rods were placed in a loose fitting quartz tube (10 mm inner diameter) for containment. The chalcogenide glasses to not react with quartz at the temperatures used in the rest of the process steps which follow. The quartz tubes were placed inside an aluminum mold to facilitate uniformity of the temperature and act as a strength member. The samples were then placed in a hot isostatic press (HIP) and purged with dry argon. The rods were then heated at 20° C./min. up to several different temperatures ranging from 230° C. to 300° C. Once at temperature, the argon pressure was gradually increased at a rate of 0.5 kpsi/min. up to the maximum pressure of either 5 kpsi or 10 kpsi, and held at this pressure for 10 minutes. The temperature was then slowly reduced at a rate of 2° C./min. to 200° C., which is about the glass transition temperature of the glass. The pressure was then slowly reduced as the sample continued to cool at a rate of about 2°

C./min. down to 150° C., followed by continued cooling at about 4° C./min. down to 60° C. By the time the samples cooled down to the 60° C. temperature, the pressure on the sample in the isostatic press was down to atmospheric pressure. The glass rods were examined under a 220× optical microscope both before and after HIPping. It was observed that all of the bubbles were completely removed, even bubbles as large as 4 mm in diameter (the largest size observed in the glass), without any trace of bubbles after treatment at temperatures ranging from 240° C. up to 300° C. and pressures of 5 and 10 kpsi. However, this was not the case for the glass rod heated at 230° C. under either 5 or 10 kpsi pressure. Although the bubbles disappeared, there was apparent micro-cracking of the glass in the vicinity of the collapsed bubbles. The collapse of the bubbles is related to the viscosity of the glass which is $10^{10}$ and $10^{8.5}$ Poise at 230° C. and 240° C., respectively. Therefore, the high viscosity of $10^{10}$ Poise at 230° C. may have resulted in incomplete removal of stresses on bubble collapse which resulted in the cracking. This stress cracking can be eliminated by leaving the glass at 230° C. for a longer period of time. However, the results of these experiments indicate that 5 kpsi for 10 minutes at 240° C. is adequate for removing gas bubbles in the glass ranging in size from a few microns to 4 mm in diameter. It should be noted that the 240° C. processing temperature used in these experiments is approximately 100° C. lower than the optical fiber drawing temperature. This is a substantial difference and far greater than the 20°–30° C. difference of the Nishi, et al process for collapsing the tube onto the rod.

Example 2

In this example, an $As_{40}S_{55}Se_5$ (atomic %) chalcogenide glass core rod was fabricated using the procedure of Example 1. The rod was 6 mm in diameter and 10 cm long. It was not HIPped as were the rods in Example 1. The chalcogenide cladding glass tube was fabricated from $As_{40}S_{60}$ chalcogenide glass by spinning a melt contained in a quartz ampoule at 1600 rpm during cooling. The tube dimensions were 6.1 mm inner diameter, 10 mm outer diameter and 9 cm long. The gap or interfacial space between the rod and tube was therefore 50 mm (0.05 mm). The core rod was inserted into the tube and the rod-in-tube assembly placed in a fiber draw furnace as shown and described in FIG. 1 with its longitudinal axis vertical. The top of the assembly was attached to a fixture so that the core/clad interface could be purged with nitrogen and evacuated. The outside surface of the cladding tube was purged with dry nitrogen and so was the interfacial space, with the nitrogen flowing downwardly through the space or gap. The bottom end of the assembly was then heated up to 300° C. for 5 minutes to soften and adhere an approximately 5–10 mm long section of the cladding glass tube to the core rod as is schematically shown in FIG. 3(b). This hermetically sealed the bottom of the cladding glass tube to the bottom of the core glass rod. The presence of the downwardly flowing nitrogen prevented soot formation on the cooler surfaces of the tube and rod in the interfacial space. The temperature in the furnace was then lowered to 100° C. and a vacuum of ≦1 mTorr was applied to the core/clad interface through the unsealed top of the assembly and the assembly lowered into the furnace at 2 mm/min. to outgas the core and cladding interfacial surfaces by driving out adsorbed water and gasses. At this relatively low temperature there is no volatilization of the glasses and therefore no soot forms on the core/cladding interfacial surfaces. This is schematically shown in FIG. 3(c). The top end of the assembly was then heated up to 265° C. while maintaining the vacuum at the core/clad interface and the top of the cladding tube softened and collapsed onto the core rod, adhering to the core rod and forming a hermetic seal under vacuum. The presence of the vacuum enabled the use of a lower temperature to seal the top. The vacuum was then discontinued as the space in rod-in-tube assembly was now hermetically sealed and under a vacuum. Thus, the cladding glass cylinder was hermetically sealed to the ends of the core glass rod to form a sealed core/cladding glass preform assembly having a vacuum at the core/clad interface and in which the interfacial surfaces were free from contamination by soot, adsorbed water and gasses.

The sealed core/cladding glass preform assembly was then cooled and placed in a hot isostatic press (an ASEA Mini Hipper Model SLIAC) in which it was heated to a temperature of 240° C. in an argon atmosphere while the pressure of the argon was raised to 5 kpsi and held at 240° C. and 5 kpsi for 10 minutes, after which it was cooled and removed from the press, following the procedure of Example 1. The preform was examined microscopically both before and after the hot isostatic pressing using an optical microscope having a resolution of approximately 5 m. It was found that the hot isostatic pressing fully collapsed all the gas bubbles, as there was no evidence of bubbles in either of the glasses or at the core/clad interface. There was no evidence of soot or bubbles at the glass interface.

The hot isostatically pressed preform was placed inside a heat shrinkable Teflon FEP tube which was then warmed under vacuum to heat shrink the FEP around the outer surface of the preform to provide a mechanical abrasion resistant coating on the surface of subsequently drawn optical fiber. The preform was then drawn into core/clad fiber in a fiber draw tower located inside a class 100 clean room using a drawing furnace as shown in FIG. 1. Optical fibers were drawn at 340° C. and a rate of approximately 2 m/min. under a dry nitrogen atmosphere. The attenuation of the fiber was measured using the cut-back technique well known to those skilled in the art on an FTIR spectrometer (Analect Diamond 20). A single length of 50 meters of continuous fiber was drawn and the measured loss on the entire length was only 0.65 dB/m. This is the lowest loss known at the present time for such a long length of chalcogenide glass fiber. The long fiber was then cut into shorter lengths of 25, 12 and 3 meters and the attenuation of each of these lengths was also measured using the cut-back technique with the FTIR spectrometer. The loss for these sections was 0.64, 0.62 and 0.55 dB/m, respectively, thereby demonstrating the consistency and uniformity of the fiber loss and therefore quality. These losses were caused by extraneous scattering centers such as carbon which is present in the raw materials used to make the glass batches. Also, the surface of the core rods was not polished, but used as-is directly after fabrication of the rods. Lower losses can be obtained by using higher quality chemicals to make the glasses and by polishing the core rods prior to use, as bubbles and soot are eliminated using this process of the invention.

Example 3 and Comparative Example

In this example the glass core rod and cladding tube were fabricated as described in Example 2. However, while the core rod dimensions were the same as in Example 2, the cladding glass tube dimensions for this example were a 6.9 mm inner diameter, 10 mm outer diameter and 9.5 cm long. In the process of the invention it is preferred that the gap between the rod and tube be less than 200 mm, but for this example the gap was 450 mm in order to demonstrate the versatility of the process of the invention. The core rod was inserted into the cladding glass tube and the bottom of the tube hermetically sealed to the bottom of the core rod following the procedure in Example 2. Following this however, only the bottom half of the assembly was heated to 100° C. under vacuum to drive off adsorbed water and gasses only from the bottom half of the interfacial glass surfaces. Next, the furnace temperature was increased to 300° C. and the assembly lowered down into the furnace to collapse the upper half of the tube onto the core rod while maintaining the vacuum to form a preform schematically illustrated in FIG. 4. As illustrated in FIGS. 2a and 2b, the high temperature processing of the upper half of the preform caused soot to be deposited at the glass interface and it also caused microbubbles to be trapped at the interface. In contrast, the bottom half of the preform was formed in accordance with the process of the invention using the steps and conditions of Example 2. Following the procedure and conditions of Example 2, the sealed core/clad assembly was then hot isostatically pressed (HIPped) at 240° C. under 5 kpsi of argon for 10 minutes to remove any residual bubbles and then drawn into core/clad fiber.

Approximately 23 meters of continuous fiber having a core/clad diameter of 200/330 mm was drawn from the lower half of the preform fabricated according to the process of the invention. The fiber dimensions were the same as those of Example 2. The loss on the 23 m long fiber was measured following the procedure of Example 2 and found to be 0.63 dB/m. In contrast, the measured loss for an 11 meter length of fiber drawn from the upper half of the preform which was fabricated according to the prior art process and not in accordance with the process of the invention, was found to be 1.17 dB/m. This therefore clearly demonstrates that the higher loss is attributable to the soot interfacial contaminants. The bubbles from both sections were eliminated by the HIPping.

Obviously, many modifications and variations of the present invention are possible in light of the above teachings. It is therefore to be understood that, within the scope of the appended claims, the invention may be practiced otherwise than as specifically described.

What is claimed is:

1. A method of forming a compound glass body which comprises two glass pieces having a common interface in which the two glasses glass pieces are in intimate contact with each other, said method comprising the steps of:
   (i) forming a composite of two glass pieces having a hermetically sealed space free of soot between them which is under a vacuum; and
   (ii) hot isostatically pressing said composite at or above all glass softening temperatures of said glass pieces to reduce the size and number of any bubbles in the glass pieces and to collapse the two pieces against each other, thereby eliminating said space.

2. A method according to claim 1 wherein said space is vacuum outgassed.

3. A method according to claim 2 wherein said pressing occurs at the lowest temperature which enables the glass pieces to collapse without cracking the glass pieces and without forming microcracks.

4. A method according to claim 3 wherein, during said hot isostatic pressing step, the isostatic pressure is reduced after a temperature of said composite is below the glass softening temperatures of said glass pieces.

5. A method of forming a glass preform having a glass core and a glass clad, the steps of which comprise:
   (i) inserting a glass core rod into a cladding glass tube sized so that a space remains between said rod and said tube;
   (ii) softening a first portion of said tube to circumferentially collapse it onto said rod and form a first hermetic seal;
   (iii) outgassing said space between said rod and tube;
   (iv) softening a second portion of said tube longitudinally spaced apart from said first hermetic seal to circumferentially collapse it onto said rod while maintaining a vacuum in said space to form a sealed composite having a vacuum in said space between said seals and wherein said space is free of soot;
   (v) hot isostatically pressing said composite above all glass softening temperatures of said rod and said tube to reduce the size and occurrence of any bubbles in the glass;
   (vi) reducing the isostatic pressing temperature below the glass softening temperatures of said rod and tube, and
   (vii) reducing the isostatic pressure.

6. A method according to claim 5 wherein an inert gas flows in said space during said formation of said first hermetic seal.

7. A method according to claim 6 wherein said outgassing is done under vacuum and at a temperature below which soot forms.

8. A method according to claim 7 wherein said second seal is formed under vacuum and wherein said sealed space is between said first and second seals.

9. A method according to claim 8 wherein said seals are made at a temperature below a temperature at which said preform may be drawn into a fiber.

10. A method according to claim 9 wherein during said flowing said inert gas flows through said space in a direction to sweep away from said space any volatile products formed by said softening of step (iv).

11. A method according to claim 10 wherein said core glass rod and said cladding glass tube comprise chalcogenide glass.

12. A method according to claim 11 wherein neither said rod nor said tube is cylindrical in cross-section.

13. A method of forming a glass preform having a glass core and a glass cladding, said preform being useful as an optical fiber preform, said method comprising:
   (i) inserting a glass core rod into a cladding glass tube sized so that a space remains between said rod and tube;
   (ii) heating one end of said tube to soften and collapse it onto said rod and form a first hermetic seal while inert gas flows through said space and out of said space through said hot portion being sealed to prevent volatile products from condensing in said space during formation of said seal;
   (iii) vacuum outgassing said space between said rod at a temperature below which soot forms;
   (iv) softening the other end of said tube to collapse it onto said rod to form a second hermetic seal while maintaining a vacuum in said space, thus sealing said space and forming a sealed composite having a vacuum in said sealed space between said seals and wherein said sealed space is essentially free of soot, and
   (v) hot isostatically pressing said composite above all glass transition temperatures of said tube and said rod to collapse said tube onto said rod and eliminate said sealed space and reduce the occurrence and size of any bubbles in the glass;

cooling said hot isostatically compressed composite to below all glass transition temperatures of said rod and said tube to form a preform.

14. A method according to claim 13 wherein said pressing occurs at the lowest temperature which enables the tube to collapse around the rod without forming cracks and without forming microcracks.

15. A method according to claim 14 wherein said isostatic pressure is reduced after said cooling.

16. A method according to claim 15 wherein said rod and said tube comprise chalcogenide glass.

* * * * *